United States Patent [19]

Yoshino et al.

[11] Patent Number: 4,564,796

[45] Date of Patent: Jan. 14, 1986

[54] DRIVING CIRCUIT FOR A STEPPING MOTOR

[75] Inventors: Tsunemi Yoshino, Nara; Akira Takashima, Osaka, both of Japan

[73] Assignee: West Electric Company, Ltd., Osaka, Japan

[21] Appl. No.: 575,685

[22] Filed: Jan. 31, 1984

[30] Foreign Application Priority Data

Feb. 2, 1983 [JP] Japan .................................. 58-16751

[51] Int. Cl.4 .............................................. H02P 8/00
[52] U.S. Cl. ...................................... 318/696; 318/685
[58] Field of Search .................... 318/685, 696; 365/78

[56] References Cited

U.S. PATENT DOCUMENTS

4,300,084  11/1981  Heeren ................................. 318/696

Primary Examiner—William M. Shoop, Jr.
Assistant Examiner—Saul M. Bergmann
Attorney, Agent, or Firm—Cushman, Darby & Cushman

[57] ABSTRACT

A driving circuit for a stepping motor drives the stepping motor in two-phase operation for most of the time period of driving and switches to a single-phase operation immediately before stopping the stepping motor, thereby achieving compatibility between high speed rotation and stable stopping position.

4 Claims, 9 Drawing Figures

DRIVING CIRCUIT FOR A STEPPING MOTOR

BACKGROUND OF THE INVENTION

1. Field of the Invention

The present invention relates generally to a driving circuit for a stepping motor, and particularly to a driving circuit for a stepping motor comprising a rotor which is driven by a pulse train impressed on coils of magnetic poles of a stator.

2. Description of the Prior Art

Several proposals have been made on devices using a stepping motor as their driving means. Such known devices utilize digital accuracy for driving the stepping motor. For instance, one proposal has been made to configure the stepping motor is to have a large through-hole at the center into which is built an optical lens barrel structure, whereby a stop means of the optical lens is linked to be driven by the rotor of the stepping motor in digital manner, thereby giving a desired aperture number of the lens stop.

Conventional stepping motors have two known driving modes, that is a, single-phase mode and a two-phase mode.

A stepping motor operated in the single-phase driving mode has a relatively small driving torque and hence a relatively small driving speed, but it is capable of being stopped in a stable manner, since poles of a rotor face and magnetic poles of a stator face one another in the stopped state. That is, although a stepping motor driven in the single-phase mode requires a relatively long time to reach a desired angular position from an initial position because of its relatively slow response characteristic, the rotor can be controlled to stop at an accurate angular position.

On the other hand, the two-phase operation is known as having a relatively large rotation torque, so that the time required for arriving at a desired angular position is relatively short. However, when the rotor rotation of a stepping motor driven in the two-phase mode stops, two adjacent magnetic poles are excited at the same polarity. Therefore, when the exciting current ceases being applied to the magnetic pole pieces, magnetic poles of the rotor move in a manner such that they face directly in front of the magnetic poles of the stator. Accordingly, through the rotation speed is relatively large, the two-phase mode of driving a stepping motor has less accuracy in controlling stop position.

Provided that the above-mentioned stepping motors are used in a driving means for controlling the focus or other parameters of an optical lens, the use of the single-phase mode driving requires a relatively long time to arrive a desired stop position, leading to loss of opportunities to obtain good photographs or blurring of photographs which are taken. On the other hand, when the stepping motor driving the lens stop is operated in the two-phase mode of driving, a high driving speed and, hence a short stop adjusting time is obtainable. Unfortunately, the final setting of the aperture may be inaccurate, resulting in inaccurate exposures of photography. As has been elucidated, the above-mentioned driving modes of the stepping motor have respective problems, and ideal driving means to solve these problems have been looked for.

SUMMARY OF THE INVENTION

Purpose of the present invention is to provide a novel driving circuit for a stepping motor, wherein the above-mentioned problems can be solved.

A driving circuit for the stepping motor in accordance with the present invention can solve the above-mentioned problem by achieving compatibility between the high speed rotation for most of the time period of rotation and accurate stopping position at the final stage of the rotation. In the present invention the mode of driving the stepping motor is switched from a two-phase mode driving (from the start of the rotation to the time immediately before the motor is to be stopped), to a single-phase mode driving (at the final stage of driving until the stepping motor is stopped).

The driving circuit for a stepping motor in accordance with the present invention comprises:

setting means for a setting a count for necessary rotational angle of the stepping motor, oscillating means for producing a pulse train with a predetermined period, counting means for counting pulses of the pulse train, comparing means for comparing the count of the counter with the set count of the setting means and for issuing a stop signal when the two counts become equal to each other, control means for issuing a first control signal beginning at the reception of a start signal and ending the reception of the stop signal and a second control signal beginning at the reception of the start signal and ending at a predetermined time after the first control signal ceases being produced, and switching means comprising a predetermined number of switching devices, connected to respective exciting coils of magnetic poles of a stator of the stepping motor and logic gates for operatively exciting selected ones of the magnetic pole pieces, in response to the first and second outputs and the pulse train. The switching means feeds exciting current to the exciting coils in two-phase mode during the presence produced by the first control signal of the control means, and to feeds exciting current to the exciting coils in single phase mode from a first point of time when the first control signal ends to a second point of time when the second control signal of the control means ends, thereby stopping the feeding of the exciting current after the second point of time.

DESCRIPTION OF THE PREFERRED EMBODIMENTS

Figure 1:
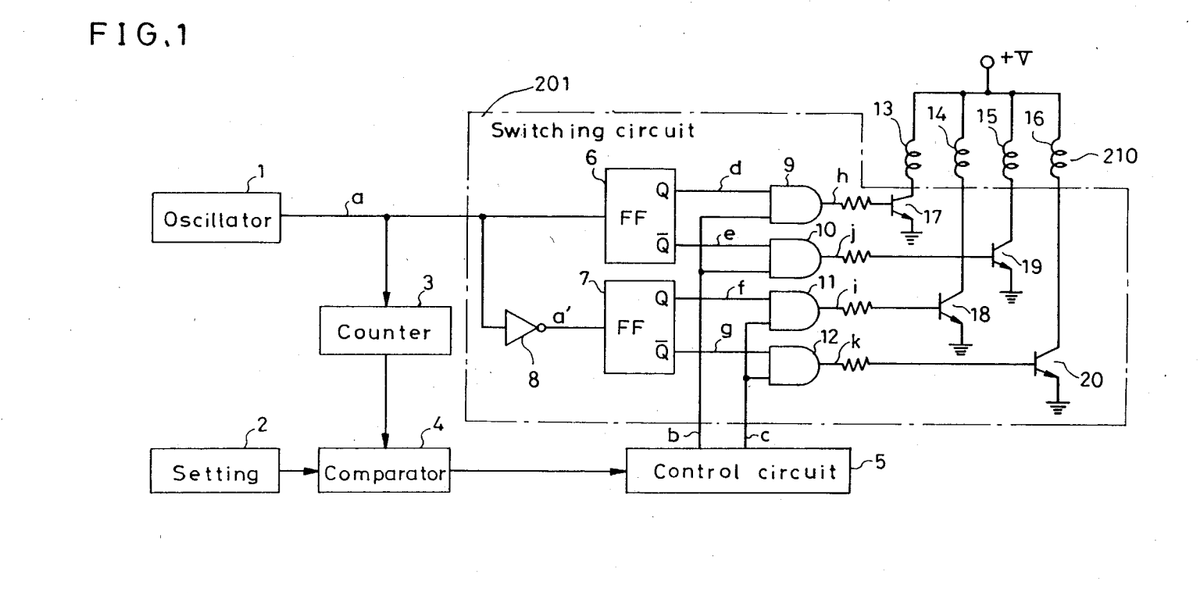
FIG. 1 is a circuit diagram of the presently preferred exemplary embodiment of a driving circuit for a stepping motor in accordance with the present invention.
Figure 2:
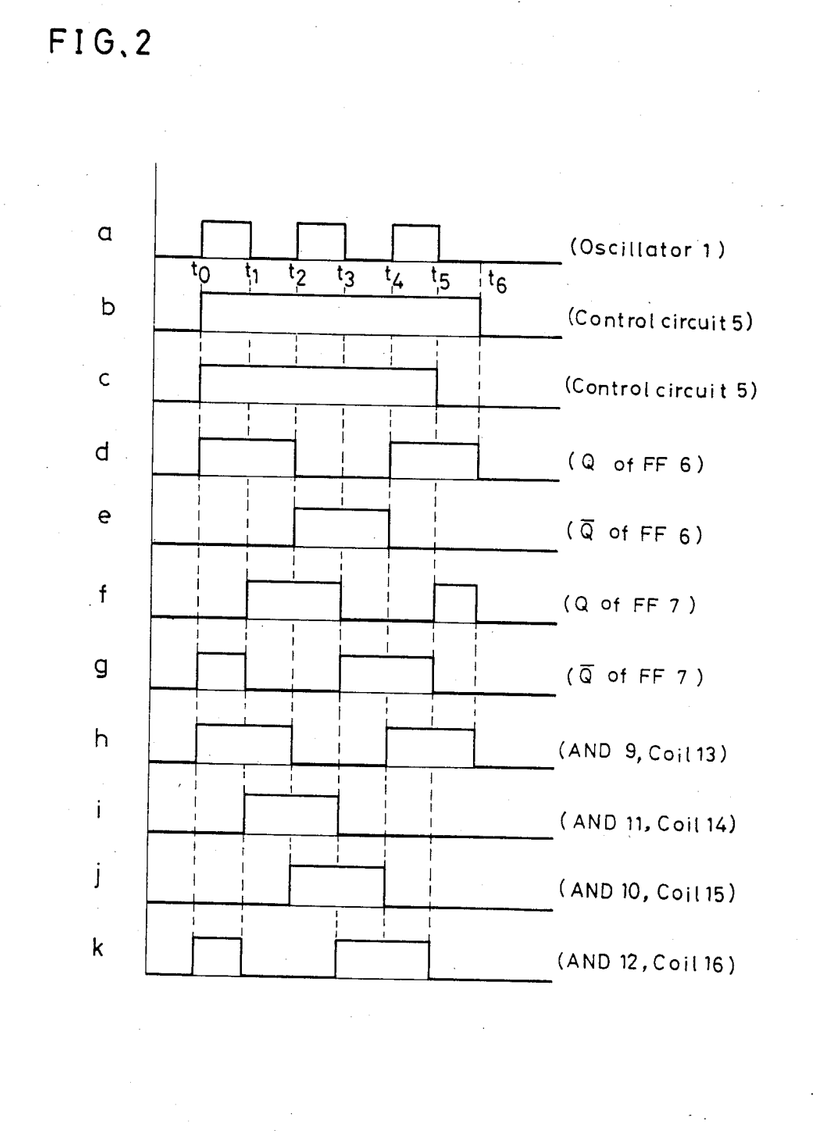
FIG. 2 is a wave form chart of signals produced by the circuit of FIG. 1.
Figure 3:
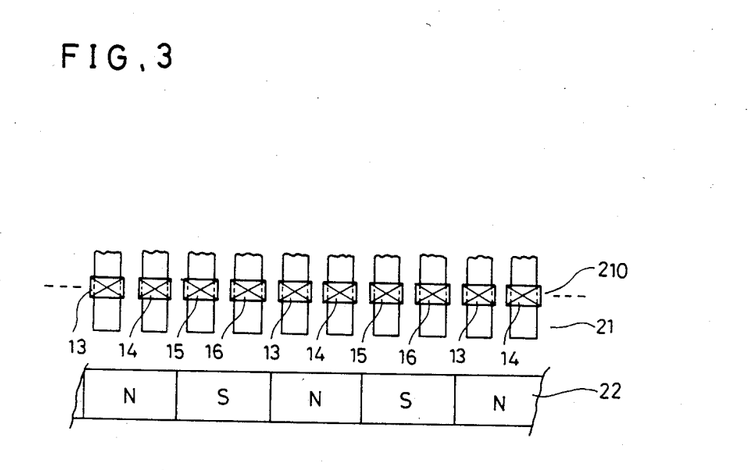
FIG. 3 is a schematic diagram illustrating the construction of a stepping motor.

FIG. 1 is a block diagram of a driving circuit for a stepping motor embodying the present invention. As shown in FIG. 1, the driving circuit includes an oscillator 1 for producing periodic pulse train which determines the angular velocity of a rotor of the stepping motor to (according to the period of the pulse train) a setting means 2 includes a set of setting switches for setting a desired angle of rotation of the stepping motor. A counter 3 counts the number of pulses from the oscillator 1, and a compartor 4 compares the number counted by the counter 3 with the set number of the setting means 2 and issues a stop signal when the two numbers are equal. A control circuit 5 receives the stop signal and issues output signals b and c shown in FIG. 2, and a switching circuit 201 receives pulse train a from the oscillator 1 and the control signals b and c from the control circuit 5 and operatively feeds exciting currents to exciting coils 13, 14, 15 and 16 of magnetic poles of a stator of the stepping motor 210. A desired rotation angle of the stepping motor is set by operating the setting means 2. The switching circuit 201 in the preferred embodiment comprises a pair of flip-flops 6 and 7 which receive pulse train a from the oscillator 1 directly and through an inverter 8, respectively. First output d and second output e of the first flip-flop 6 are applied to a first inputs of AND logic 9 and AND logic 10, respectively. Control signal b is applied to the other inputs of the AND gates 9 and 10. First output f and second output g of the second flip-flop 7 are applied to the first inputs of AND logic 11 and AND logic 12, respectively. Control signal c is applied to the other inputs of the AND gates 11 and 12. Four output signals h, j, i, k of the AND gates are applied to the bases of the output transistors 17, 19, 18 and 20, whose collectors are connected to the exciting coils 13, 14, 15 and 16, respectively. The exciting coils 13, 14, 15 and 16 are provided in a predetermined plural number, for instance, six sets or eight sets of the same coils connected to be commonly driven by the same signal, and the sets are arranged in regularly repeating order (as shown in FIG. 3). In order to enable two-phase mode driving, magnetic pole pieces are arranged in such a number that two magnetic pole pieces 21 of the stator face to each magnetic pole piece 22 (e.g. permanent magnet pole pieces) of the rotor.

Operation of the above-mentioned driving circuit is described with reference to FIG. 2, which is a waveform chart showing waveforms of signals of various parts of FIG. 1. Firstly, by closing a power source switch, (which is not shown in FIG. 1) the circuit starts operation a desired rotation angle is set in the setting means 2. Then, by a closing of a starting switch (which is not shown in FIG. 1) at a time $t_0$, the oscillator 1 starts to produce pulse train a as shown in FIG. 2. The resulting pulse trains are fed to the first flip-flop 6 directly as pulses a, and through an invertor 8 as pulses a' to the second flip-flop 7. Non-inverted pulses are also applied to the counter 3.

The control circuit 5 issues output signals b and c to the AND gates 9, 10, 11 and 12. The control signal b rises at the time $t_0$ and falls at the time $t_6$ as shown in FIG. 2, and the control signal c rises at the time $t_0$ and falls at the time $t_5$ as shown in FIG. 2.

Accordingly, the flip-flops 6 and 7 operate as will now be described: Since the flip-flop 6 receives the pulse train a directly from the oscillator, its two outputs d and e (from (produced at output terminals Q and $\overline{Q}$ respectively) rise and fall at the times $t_0$ (d rises), $t_2$ (d falls), $t_4$ (d rises), $t_6$ (d falls) and $t_2$ (e rises), $t_4$ (e falls), respectively. Flip-flop 7 receives the inverted pulse train through the invertor 8, and issues output signals f and g from its first output Q and second output $\overline{Q}$. The signals f and g rise and fall at the time $t_1$ (f rises), $t_3$ (f falls), $t_5$ (f rises), $t_6$ (f falls) and $t_0$ (g rises), $t_1$ (g falls), $t_3$ (g rises), $t_5$ (g falls), respectively, as shown in FIG. 2.

The above-mentioned output signals d, e, f and g are applied to the AND gates 9, 10, 11 and 12, and therefore, the output signals h, j, i and k are applied through respective resistors to the gates of the switching transistors 17, 19, 18 and 20, respectively. Transistors 17, 18, 19 and 20 control the exciting currents of the coils 13, 14, 15 and 16, respectively. That is, when the output signal of the AND gate 9, 10, 11 or 12 is at logic level 1 (H level), the exciting currents in the coils 13, 15, 14 and 16 flows. Likewise, current ceases to flow in coils 13, 14, 15 and 16 when the output signal of the AND gate 9, 10, 11, 12 applied to the respective transistor 17-20 operatively connected to the coils falls to logic level 0 (L level). Accordingly, the stepping motor is driven as follows.

At the time $t_0$, the AND gates 9 and 12 issue an H output and turn the transistors 17 and 20 ON. At this time, AND gates 10 and 11 issue L outputs thereby causing the transistors 18 and 19 to remain OFF. Accordingly, the coils 13 and 16 are excited and coils 14 and 15 are not excited.

Figure 4A:
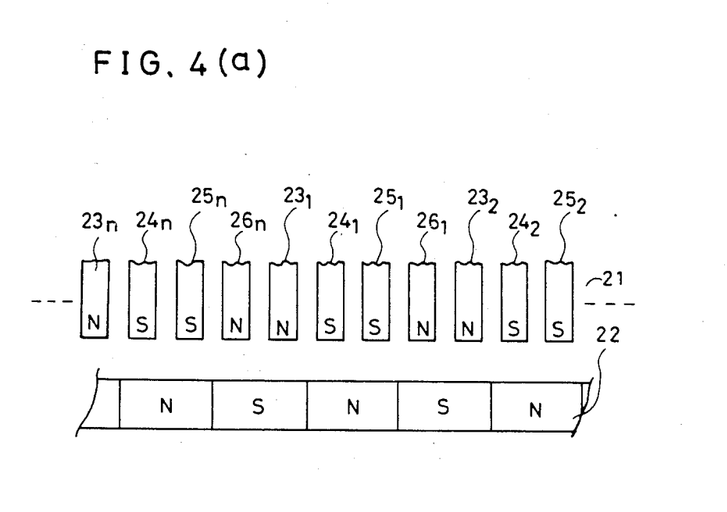
FIG. 4a is a schematic diagram illustrating the two-phase driving mode of the stepping motor shown in FIG. 3.
Figure 4B:
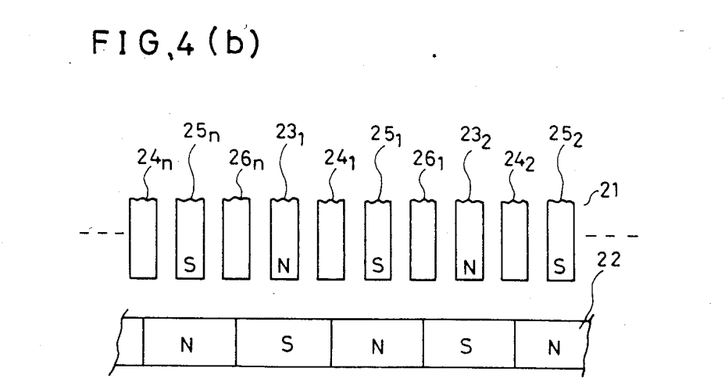
FIG. 4b is a schematic diagram illustrating the single-phase driving mode of the stepping motor shown in FIG. 3.

States of the magnetic poles of the stator of the stepping motor are shown in FIG. 4(a) and FIG. 4(b). In these figures, numeral 21 comprehensively designates the magnetic pole pieces of the stator and numeral 22 designates permanent magnet pole pieces of the rotor. In the examples of FIG. 4(a) and FIG. 4(b), pole pieces $23_1$, $23_2$, ... $23_n$ are provided with the coils 13 to be controlled by the transistor 17, pole pieces $24_1$, $24_2$, ... $24_n$ are provided with the coils 14 to be controlled by transistor 18, pole pieces $25_1$, $25_2$, ... $25_n$ are provided with the coils 15 to be controlled by the transistor 19, and pole pieces $26_1$, $26_2$, ... $26_n$ are provided with the coils 16 to be controlled by the transistor 20. Accordingly, the states of the magnetic pole pieces 21 and the permanent magnetic pole pieces 22 are as shown in FIG. 4(a). For each of the permanent magnetic pole pieces 22 of the rotor, there are two magnetic pole pieces 21, whose magnetic polarity is opposite to the magnetic polarity of the permanent magnetic pole pieces 22.

As an example, suppose setting means 2 sets "3" as the number of steps the rotor of the stepping motor is to be rotated at the point in time when the counter 3 counts "3", the comparator 4 issues a stop signal to the control circuit 5.

Since the signals a, b and c are as shown in the waveforms of FIG. 2, when the third pulse falls at $t_5$ the comparator 4 issues the stop signal and causes the control signal c to fall at $t_5$, and thereafter causes the other control signal b to fall at $t_6$. When the control signal b falls (at the time $t_6$), the power source circuit (not shown) is stopped, thereby resetting the whole circuit to an initial state after the time $t_6$.

The operation of the circuit is described in detail from the time $t_0$ to the time $t_6$ with reference to the waveforms of FIG. 2.

Firstly at the time $t_0$, the d, e, f and g output signals are H, L, L and H, respectively, and accordingly outputs h, j, i and k of the AND gates 9, 10, 11 and 12 are H, L, L and H. In this initial state, the transistors 17 and 20 are ON and feed the exciting current to the coils 13 and 16. Therefore, the magnetic pole pieces $23_1$, $23_2$, ... $23_n$ and those of $26_1$, $26_2$, ... $26_n$ are excited. Accordingly, the magnetic pole pieces 22 of the stator becomes the state that in each set $23_1$, $24_1$, $25_1$ and $26_1$, or $23_2$, $24_2$, $25_2$ and $26_2$, ... $23_n$, $24_n$, $25_n$ and $26_n$, the magnetic pole distribution becomes N, S, S and N, as shown in FIG. 4(a).

Accordingly, the centers of each permanent magnet pole piece 22 faces the center between two poles pieces of the opposite polarity to the former.

Next, immediately after the time $t_1$ (i.e. upon the first falling edge of a pulse produced by oscillator 1), as a result of the inverting of the flip-flop 7, the AND gates 9, 10, 11 and 12 produce signals with levels H, L, H and L, respectively. Therefore, the transistors 17 and 18 become conductive (thus applying current to coils 13 and 15) and transistors 19 and 20 become nonconductive (thus causing no current to flow through coils 15 and 16). Because current flows through only coils 13 and 14, magnetic pole pieces $23_1$–$23_n$ and $25_1$–$25_n$ keep the same polarities they had prior to time $t_1$, and magnetic pole pieces $24_1$–$24_n$ and $26_1$–$26_n$ each reverse in polarity. Accordingly, the states of the polarities of each set of magnetic pole pieces $23_1$–$26_1$, $23_2$–$26_2$, $23_3$–$26_3$ and $23_n$–$26_n$ change to N, N, S and S. As a result of the above-mentioned change of the polarities, the centers of each permanent magnetic poles pieces 22, which are attracted so as to be in front of the inbetween-center positions of the two neighboring magnetic pole pieces of polarity opposite to the polarity of the permanent magnetic pole pieces 22, move rightwards, thereby causing, the permanent magnetic pole pieces 22 move rightwards of the position shown in FIG. 4(a).

Next, at the time $t_2$ and thereafter, the flip-flop 6 changes state, thereby causing its outputs d and e to be inverted as shown in FIG. 2. Accordingly, at the time $t_2$ and thereafter, the AND gates 9, 10, 11 and 12 become produce signals L, H, H and L, thereby making the transistors 18 and 19 turn on and feed the exciting coils 14 and 15 exciting currents. Accordingly, the above-mentioned sets of the magnetic pole pieces of the stator change polarity to S, N, N and S, thereby further applying a rightward moving force to the permanent magnetic pole pieces 22.

Thereafter, in a similar way, upon risings and fallings of the pulses of the pulse train a, two of the magnetic pole pieces 21 are excited. Accordingly, the permanent magnetic pole pieces 22 of the rotor move by a distance of one pitch of the magnetic pole piece 21 of the stator for half pitch time of the pulse train, namely, $t_0$–$t_1$, $t_1$–$t_2$, $t_2$–$t_3$, ... $t_5$–$t_6$. That is, the rotor having the permanent magnet pole pieces 22 rotates by a distance or angular position of two pitches of the magnetic pole pieces 21 of the stator for one cycle of the pulse train. Thus, the above-mentioned driving of the stepping motor is in the two-phase mode driving.

The above-mentioned description is for an operating example of 3 step-angular rotation of the stepping motor, and therefore the stop signal from the comparator 4 is issued at the falling edge of the third pulse of the pulse train from the oscillator 1. And at the time $t_5$, the output c of the control circuit 5 falls. This is the important feature of the present invention in that the operation mode of the stepping motor is switched from the previous two-phase mode into hereafter single-phase mode as follows.

That is, at the time $t_5$ and thereafter, the outputs d, e f and g of the flip-flops 6 and 7 become H, L, H and L, respectively, and the outputs b and c of the control circuit 5 are H and L, respectively. Accordingly, the outputs h, j, i and k of the AND gates 9, 10, 11 and 12 become H, L, L and L. Therefore, at the time $t_5$ a single transistor 17 only is conductive, unlike previous states in which two transistors have been conductive.

The state when only one transistor 17 is conductive results in that only the exciting coil 13 is fed with the exciting current. Accordingly, the magnetic pole pieces $23_1$, $23_2$, ... $23_n$ only are excited as shown in FIG. 4(b). In this case, the magnetic poles pieces $25_1$, $25_2$, ... $25_n$ which are opposite to the magnetic poles pieces $23_1$, $23_2$, ... $23_n$ are magnetized in opposite polarity to the latters. That is, in the magnetic pole pieces 21 of the stator, the arrangement of poles are, for example, ... S, O, N, O, S, O, N, O, ..., (where each 0 designates non-magnetization). Accordingly, the permanent magnet pole 22 of the rotor faces in front of the magnetic pole pieces 21 which are magnetized in opposite polarity to the former, in an angular relation of center-to-center accurately facing one another.

That is, at the time $t_5$ and thereafter, the driving of the stepping motor is changed into a single-phase mode of driving, which is a stationary state produced immediately before the stopping of the exciting current. The magnetic pole pieces 21 are excited in an ideal polarity relation with respect to the permanent magnet pole pieces of the rotor in that the opposite polarity pole pieces of the rotor and stator face with their centers of their pole pieces immediately in front of one another, thereby accurately defining the stopping position as shown in FIG. 4(b). As has been described, after the time $t_6$, the power source is cut off, and the circuit stops thereby causing the stepping motor maintain the stopped postion. In the stopped state, even after discontinuing applying the exciting currents in the exciting coils, the above-mentioned positional relation between the stator and rotor is accurately maintained because the stopping position is a stable position where each center of the magnet pole piece atracts the center of a magnetic pole piece of the stator, contrary to the conventional two-phase operation mode where the rotor stops with its permanent magnetic pole piece between two magnetic pole pieces of the stator (thereby allowing angular drift of the rotor by magnetic attraction between each permanent magnet pole piece and either one of two magnetic pole pieces facing the former of the stator).

Figure 5:
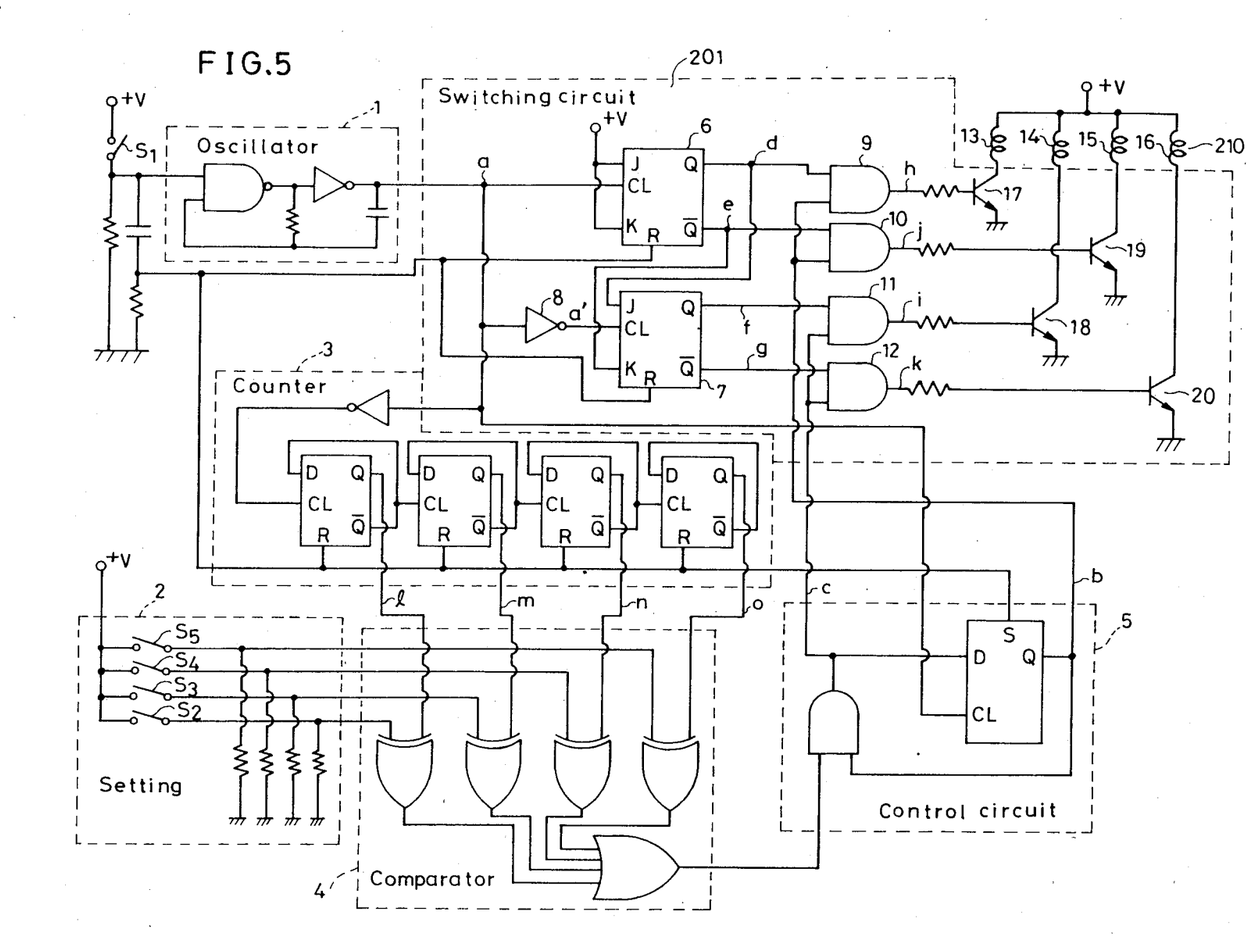
FIG. 5 is a detailed circuit diagram of the driving circuit shown in FIG. 1.
Figure 6:
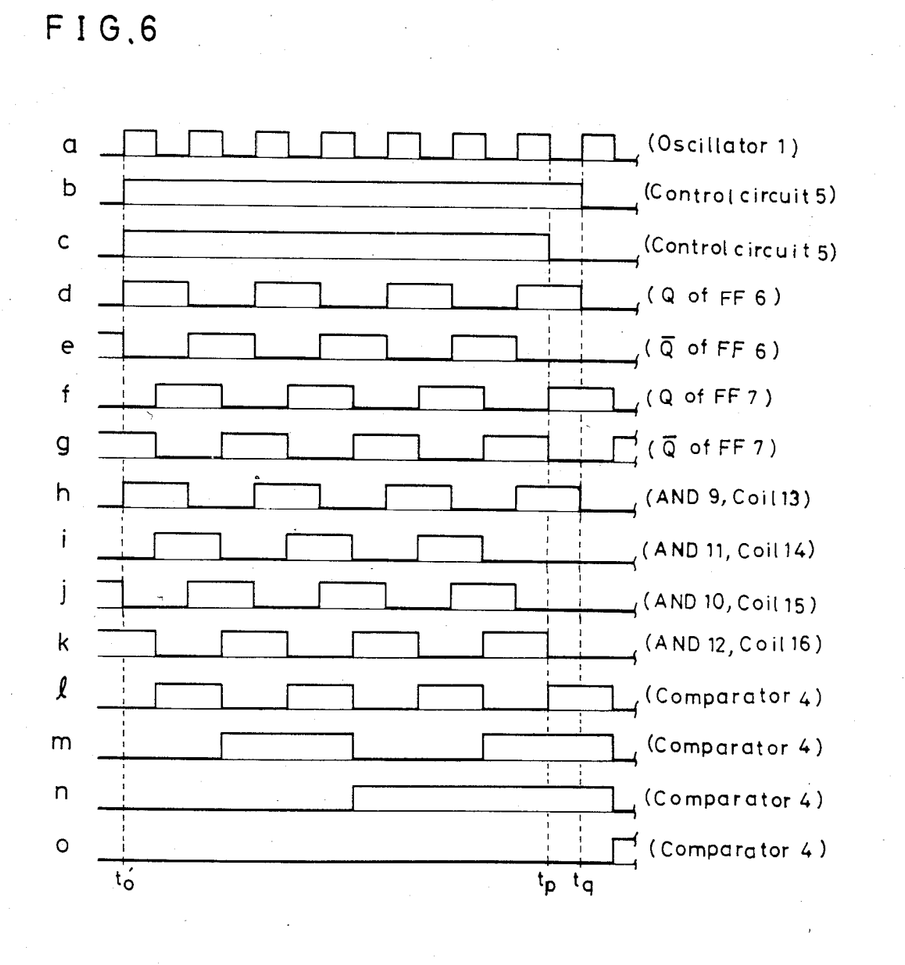
FIG. 6 is a wave form chart showing wave forms of various signals produced by the circuit of FIG. 5.

FIG. 5 is a more detailed schematic diagram of the driving circuit for a stepping motor embodying the present invention, wherein the corresponding parts are designated with the corresponding numerals and marks. The waveforms of various parts of FIG. 5 are shown in FIG. 6. A starting switch $S_1$ connected to the oscillator 1 causes the oscillator to begin oscillating. The counter 3 has four stages of D flip-flops whose outputs l, m, n and o are connected to the comparator 4. The setting means 2 comprises four setting switches $S_2$, $S_3$, $S_4$ and S5. The control circuit 5 has one D-flipflop and one AND gate.

The operation of the driving circuit of FIG. 5 will now be described.

When the start switch S1 is closed at a time t0, shown in FIG. 6, the known oscillator 1 starts oscillation and produces output pulse train a as shown in FIG. 6. At the same time, D flip-flops of the counter 3 and JK-flip-flops 6 and 7 are reset, and the D flip-flop of the control circuit 5 is set thereby making the outputs c and b thereof rise as shown in FIG. 6. As a result of the above-mentioned signals, the output signals d, e, f and g of the flip-flops 6 and 7 as shown in FIG. 6 are applied to the AND gates 9, 10, 11 and 12, and therefore, the AND gates produce output signals h, j, i and k as shown in FIG. 6.

As previously described with respect to the circuit of FIG. 1, the transistors 17, 18, 19 and 20 are controlled operatively by the AND gates 9, 10, 11 and 12 which receive the signals d, e, f and g, and the signals b and c, and the exciting coils 13, 14, 15 and 16 of the stepping motor are operatively excited as described with reference to FIG. 4(a) and FIG. 4(b). Accordingly, the stepping motor is driven in the two-phase mode operation from the time t0, until the time $t_p$. On the other hand, at the time t0, the D flip-flops in the counter 3 begin changing state and issues output signals l, m, n and o as shown in FIG. 6. These output signals are applied to the exclusive OR (XOR) gates of the comparator 4 whose other inputs are connected to the setting means 2 and whose output is applied through an OR gate to AND gate of the control circuit 5.

Accordingly, provided that switches S2, S3 and S4 are closed, all outputs of the XOR gates are in L level at the time $t_p$, and accordingly the output of the comparator 4 changes from an H level to a L level.

When the output of the comparator 4 changes from H to L, control signal c of the control circuit 5 changes from hitherto H level to L level, and accordingly, outputs i and k of the AND gates 11 and 12 remain at L level irrespective of change of the next output of the flip-flop 7. Therefore, manner of rotation of the stepping motor by controlling of the transistors 17, 18, 19 and 20 changes, as shown in FIG. 1, from the hitherto operated two-phase mode into a single-phase mode at the time $t_p$.

Thereafter, namely after the time $t_p$, as a result of rise of the next pulse of the pulse train, the control signal b from the control circuit 5 changes from hitherto H level to L level, and therefore, outputs h and j of the AND gates 9 and 10 remain at L level similarly as the outputs i and k, irrespective of the outputs d and e of the flip-flop 6, thereby interrupting the current applied to the stepping motor in order to stop it. In the control circuit 5, the output Q of the D flip-flop is connected to be fed back through an AND gate to a D input of the D flip-flop, and therefore, the D flip-flop in the control circuit 5 is retained at an L level after once becoming in L level, irrespective of the states of the oscillator 1 and the counter 3, as may be understood from FIG. 5. Incidentally, by once opening and again closing the start switch S1, the circuit is again brought in a fresh set state, wherein a two-phase mode driving starts again.

Figure 7:
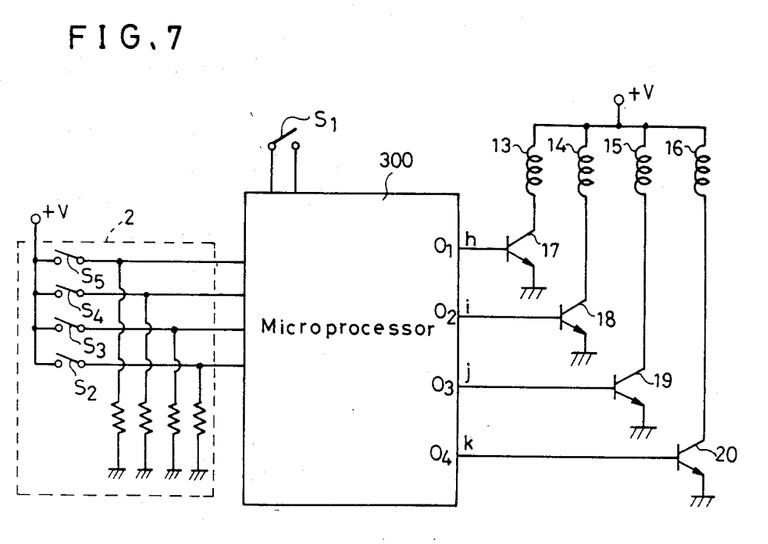
FIG. 7 is a circuit diagram of a second embodiment of the invention wherein some parts of the circuit are implemented by a microprocessor.
Figure 8:
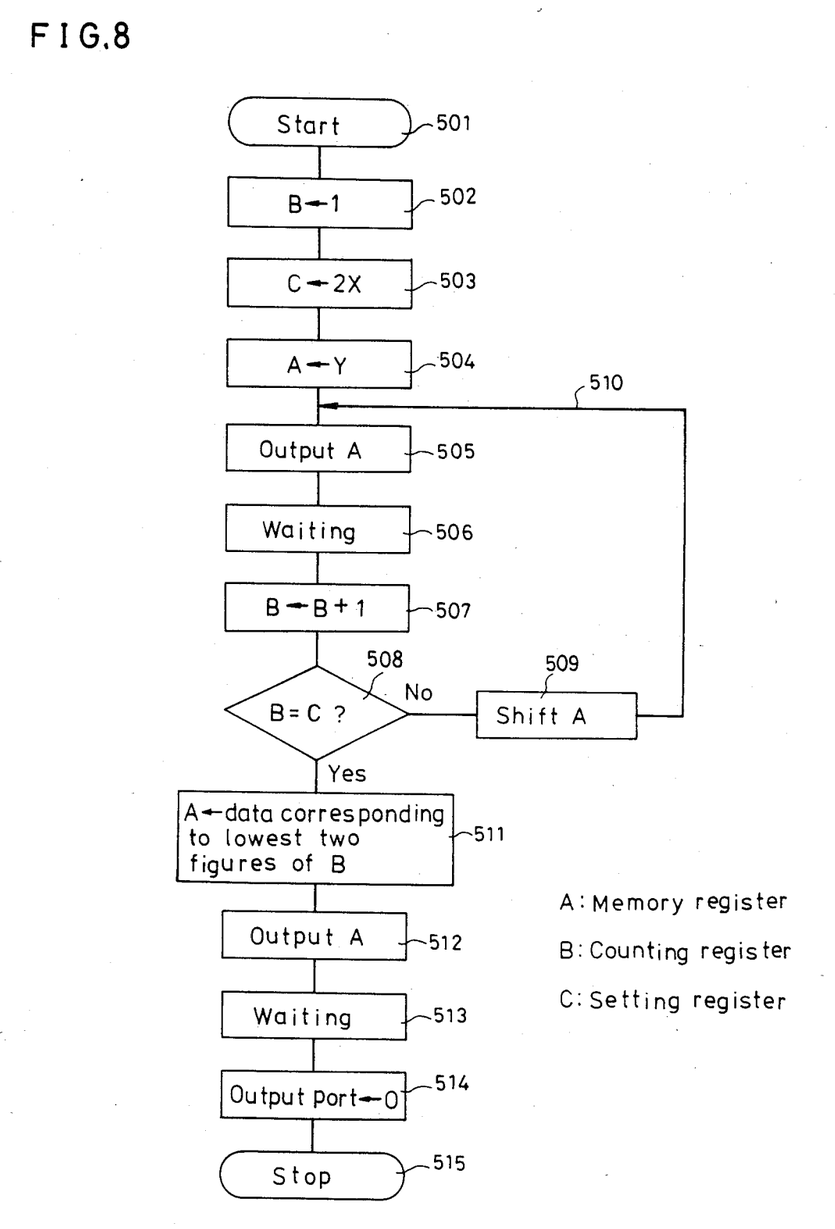
FIG. 8 is a flow chart of the steps performed by the microprocessor 300 of the circuit of FIG. 7.

FIG. 7 is a circuit diagram of another embodiment of the present invention employing a microprocessor 300 including internal components having functions equivalent to oscillator 1, counter 3, comparator 4, control circuit 5 and switching circuit 201 described in connection with FIG. 1 and FIG. 5. The operation of the microprocessor is described with reference to FIG. 8, which is a flow-chart of a software program executed by the microprocessor 300 for performing the operations corresponding to that of the embodiment shown in FIG. 5 and FIG. 6. Execution of the process shown in FIG. 8 is begun by closing the start switch S1 connected to the microprocessor 300, and in a second state 502 the contents B of a counting register are initialized by storing "1" therein. Then, as a third step 503, X for a desired pulse count corresponding to desired rotation angle (for 2X steps) of the stepping motor read from setting circuit 2 and stored in a setting register C. In a fourth step 504, initial states Y of exciting coils are input to a memory register A. Then, in a fifth step 505, the contents of the memory register A is output to an output port $O_1$, $O_2$, $O_3$, $O_4$. In the sixth step, the process waits for a predetermined time until a next fall or rise of pulse occurs. In a seventh step 507, the contents of the counting register B is incremented by 1. In a eighth step 508, the incremented result B is compared with the contents of the setting register C. When comparison result is NO, contents of the memory register A is the process branches (via a route 510) to the fifth step 505 again. When the comparison result is YES, the process advances to the step designated by 511 wherein data corresponding to the lowest two figures of the register B is stored in the memory register A. Thereafter, in the step 512, the contents of the memory register A is output. Next step 513 is a step of waiting for a predetermined time until the next fall or rise of pulse comes. The next step 514 is to resets the output port and a final step 515 is stops the process. In the above-mentioned step 511, the setting of the lowest two figures of B into the memory register A is made as in TABLE 1.

TABLE 1

| Date of count register B | Date to be set in register A |
|---|---|
| 00 | 0100 |
| 01 | 1000 |
| 10 | 0001 |
| 11 | 0010 |

In an initial state of the circuit, upon closing of the starting switch S1 the outputs h and k are at an H level, and accordingly, the state of the exciting coils 13 and 16 are ON, and 14 and 15 are OFF. And in general, the value stored in the counting register B advances as shown in TABLE 2.

TABLE 2

| Number of step | Data of counting register B |
|---|---|
| 1 | 0010 |
| 2 | 0011 |
| 3 | 0100 |
| . | . |
| . | . |
| . | . |
| 13 | 1101 |
| 14 | 1110 |
| 15 | 1111 |

On the other hand, the setting register C stores value 2X which is the number of unit angle to be rotated. Now, provided that 2X is 14 in decimal, i.e. 1110 in binary digits, then the step 508 advances in the YES direction. Next, a value 0001, which corresponds to 10 in decimal, (which is the contents of the lowest 2 digits of the contents 1110 of the counting register B at that time), is set in the memory register A. Next, the data 0001 of the memory register is output to the output port thereby causing only the transistor 17 to be ON, hence exciting the exciting coil 13 only, thus realizing the single-phase mode driving at the final step before stopping rotation of the stepping motor. Then, by outputting 0000 to the output port, the circuit is reset to a stable state.

As has been described with respect to various embodiments, the driving circuit for the stepping motor in accordance with the present invention can realize compatibility between high speed rotation by employing two-phase mode driving for most of the time period of driving the motor and a single-phase mode driving at the very last stage, namely, the instant the motor is to be stopped. Accordingly, good stability and accurate control of the stopping position is attainable along with high speed rotation of the stepping motor.

Because the compatibility of high speed driving and accurate stop position is achievable when the driving circuit for a stepping motor in accordance with the present invention is employed, a stepping motor so controlled may be used as a light stop driving means for an optical lens. Excellent performance as a camera stop control means is attained, affording quick automatic lens setting adjustments during photography as a result of the high speed driving of the stepping motor and accurate exposure as a result of the accurate stopping position. A very useful camera is obtained which responds rapidly to measured light parameters and provides accurate lens adjustment accordingly.

What is claimed is:

1. A driving circuit for a stepping motor including a stator having plural magnetic pole pieces, each of said pole pieces including an excitation coil, said circuit comprising:
    setting means for inputting a value including a desired rotational angle of a stepping motor,
    means for producing a start signal,
    oscillating means for producing a pulse train having a predetermined period,
    counting means for counting pulses of said pulse train,
    comparing means for comparing the count of said counting means with the value inputted by said setting means and for issuing a stop signal when said count and said inputted value become equal to one other,
    control means for producing a first control signal beginning when said start signal producing means produces said start signal and ending when said comparing means produces said stop signal and for producing a second control signal beginning when said start signal producing means produces said start signal and ending a predetermined time after said first control signal ends, and
    switching means comprising a plurality of switching devices connected to respective excitation coils of said stepping motor, for operatively selectively exciting selected ones of said magnetic pole pieces in response to said first and second control signals and said pulse train, said switching means for applying excitation current to said excitation coils in a two-phase mode of operation of said stepping motor for the duration of said first control signal, and for applying excitation current to said excitation coils in a single phase mode of operation of said stepping motor from a first point of time when said first control signal ends to a second point of time when said second control signal ends, and for ceasing applying said excitation current after said second point of time.

2. A driving circuit as in claim 1, wherein said switching means comprises:
    first flip-flop means for producing a first pulse output and a second pulse output in response to the pulses of said pulse train produced by said oscillating means,
    second flip-flop means for producing a third pulse output and a fourth pulse output in response to the inversion of said pulse train,
    first and second AND gates connected to receive said first pulse output and said second pulse output at first inputs thereof, respectively, and each connected to receive said second control signal at second inputs thereof,
    third and fourth AND gates connected to receive said third pulse output and said fourth pulse output at first inputs thereof, respectively, and each connected to receive said first control signal at second inputs thereof, and
    first, second, third and fourth switching devices, connected to first, second, third and fourth ones of said excitation coils of said plural magnetic pole pieces, respectively, to control exciting current thereof, each of said switching devices including a control terminal, said control terminals of said first, second, third and fourth switching devices connected to the outputs of said first, second, third and fourth AND gates, respectively.

3. A method of controlling a stepping motor comprising the steps of:
    (1) inputting a value indicating the number of steps of a desired rotational angular displacement of a stepping motor;
    (2) producing a periodic pulse train;
    (3) electrically exciting adjacent ones of plural magnetic pole pieces of the stator of said stepping motor simultaneously in response to the pulses of said pulse train, thereby driving said stepping motor in a two-phase mode of operation;
    (4) counting the pulses produced by said producing step (2);
    (5) determining when the number of pulses counted by said counting step (4) is equal to the number of steps inputted by said inputting step (1);
    (6) for a predetermined time after said determining step (5) determines said number of pulses equals said number of steps, electrically exciting only non-adjacent ones of said plural magnetic pole pieces of the stator simultaneously in response to the pulses of said pulse train, thereby driving said stepping motor in a single-phase mode of operation; and
    (7) after said predetermined time has elapsed, ceasing electrically exciting said plural magnetic pole pieces to thereby stop rotation of said stepping motor.

4. An apparatus for controlling a stepping motor of the type including a stator having plural magnetic pole pieces each responsive to electrical excitation, said apparatus comprising:
    means for inputting a value indicating the number of steps of a desired rotational angular displacement of said stepping motor;
    means for producing a period pulse train;

means for counting the pulses produced by said pulse-producing means;

means for determining when the number of pulses counted by said counting means is equal to the number of steps inputted by said inputting means; and control means for (a) electrically exciting adjacent ones of said plural magnetic pole pieces of the stator of said stepping motor simultaneously in response to the pulses of said pulse train whenever said count of said counting means is less than said number of steps inputted by said inputting means, thereby driving said stepper motor in a two-phase mode of operation, for (b) electrically exciting only non-adjacent ones of said plural magnetic pole pieces of the stator simultaneously in response to the pulses of said pulse train for a predetermined period of time after said determining means determines said number of pulses is equal to said number of steps, and for (c) ceasing electrically excitating said plural magnetic pole pieces after said predetermined period of time has elapsed to thereby stop rotation of said stepping motor.

* * * * *